US008635530B2

(12) United States Patent
Brugler et al.

(10) Patent No.: US 8,635,530 B2
(45) Date of Patent: Jan. 21, 2014

(54) STATISTICAL FILTERING OF DATA USING GRAPHICAL USER INTERFACES IN INFORMATION TECHNOLOGY SYSTEMS

(75) Inventors: Thomas S. Brugler, Fuquay-Varina, NC (US); Vincent C. Conzola, Raleigh, NC (US); Randall A. Craig, Raleigh, NC (US); Todd M. Eischeid, Cary, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/024,040

(22) Filed: Feb. 9, 2011

(65) Prior Publication Data

US 2012/0204122 A1   Aug. 9, 2012

(51) Int. Cl.
*G06F 3/048* (2013.01)
(52) U.S. Cl.
USPC ........... 715/711; 715/769; 715/209; 715/771; 345/440; 705/26.1; 364/401
(58) Field of Classification Search
None
See application file for complete search history.

(56) References Cited

U.S. PATENT DOCUMENTS

| | | | |
|---|---|---|---|
| 4,674,043 A * | 6/1987 | Hernandez et al. | 715/209 |
| 5,619,631 A * | 4/1997 | Schott | 345/440 |
| 7,672,944 B1 | 3/2010 | Holladay et al. | |
| 2006/0074879 A1 | 4/2006 | Covington et al. | |
| 2006/0109271 A1 * | 5/2006 | Lomask | 345/440 |
| 2007/0078881 A1 | 4/2007 | Vignet | |
| 2010/0235771 A1 * | 9/2010 | Gregg, III | 715/769 |
| 2011/0082759 A1 * | 4/2011 | Swinson et al. | 705/26.1 |

* cited by examiner

*Primary Examiner* — Boris Pesin
*Assistant Examiner* — Ayesha Huertas Torres
(74) *Attorney, Agent, or Firm* — Kenneth L. Sherman, Esq.; Michael Zarrabian, Esq.; Sherman & Zarrabian LLP

(57) ABSTRACT

Statistical filtering of data using graphical user interfaces in information technology systems. One embodiment comprises generating a graphical statistical representation of a data set and displaying the graphical statistical representation on an electronic display. One or more manipulable graphical elements are also displayed in conjunction with the graphical statistical representation, wherein the manipulable graphical elements represent one or more statistical ranges for the graphical statistical representation. Based on user adjusting one or more of the manipulable graphical elements specifying one or more adjusted statistical ranges, the data set is filtered to correspond to the graphical statistical representation within the one or more adjusted statistical ranges.

17 Claims, 12 Drawing Sheets

STATISTICAL FILTERING OF DATA USING GRAPHICAL USER INTERFACES IN INFORMATION TECHNOLOGY SYSTEMS

BACKGROUND OF THE INVENTION

1. Field of the Invention

The present invention relates to data filtering, and in particular to statistical filtering of data using graphical user interfaces in information technology systems.

2. Background Information

Tabular information presentation is utilized in many graphical user interfaces in information technology systems. Tables are the most prevalent way to display large amounts of data. Given the amount of data, the user is typically in need of a filtering mechanism for quickly and efficiently reducing the number of entries/rows in a table for ease of viewing and comprehension.

BRIEF SUMMARY OF THE INVENTION

Embodiments of the invention provide statistical filtering of data using graphical user interfaces in information technology systems. One embodiment comprises generating a graphical statistical representation of a data set and displaying the graphical statistical representation on an electronic display. One or more manipulable graphical elements are also displayed in conjunction with the graphical statistical representation, wherein the manipulable graphical elements represent one or more statistical ranges for the graphical statistical representation. Based on user adjusting one or more of the manipulable graphical elements specifying one or more adjusted statistical ranges, the data set is filtered to correspond to the graphical statistical representation within the one or more adjusted statistical ranges.

Other aspects and advantages of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

Figure 1A:
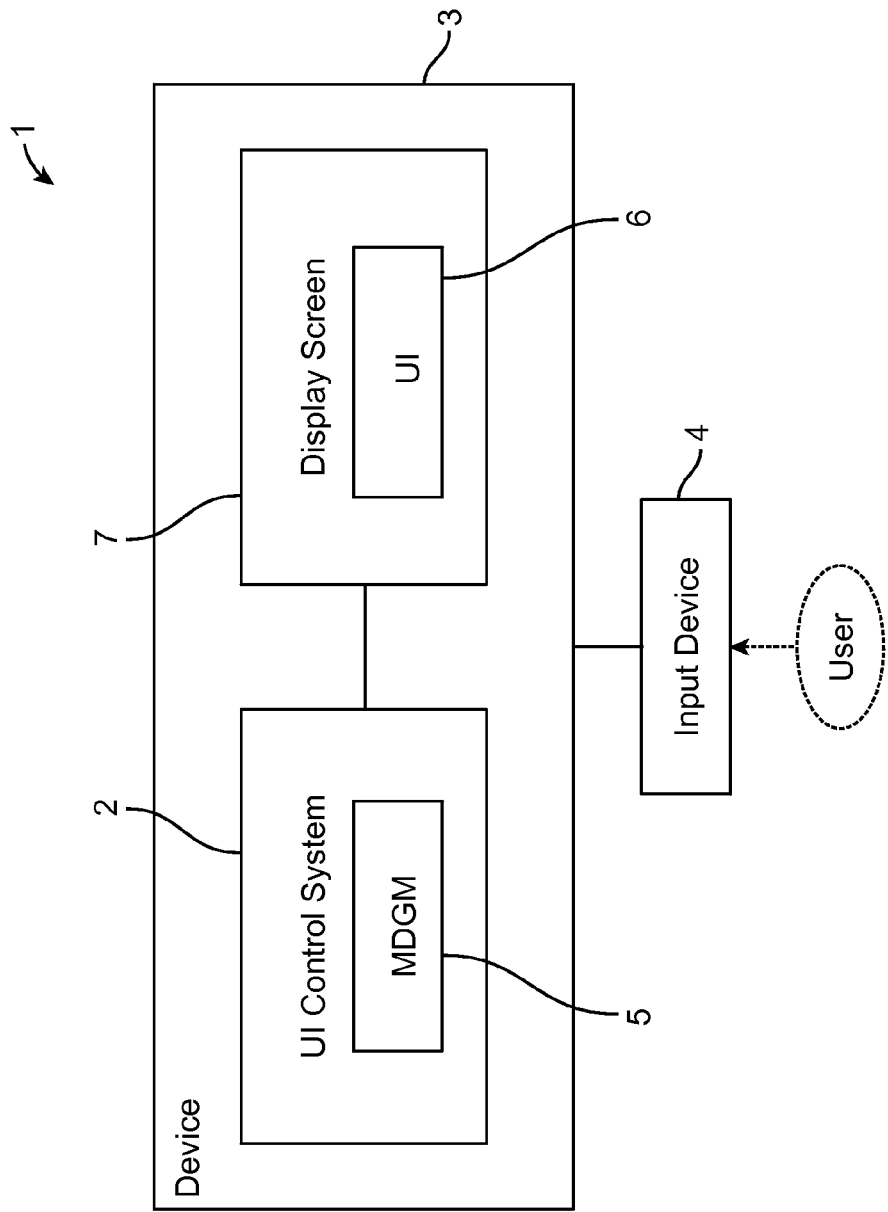
FIG. 1A illustrates a system for content presentation comprising statistical filtering of data using a graphical user interface according to one embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification, as well as meanings understood by those skilled in the art and/or as defined in dictionaries, treatises, etc. The description may disclose several preferred embodiments for content presentation, as well as operation and/or component parts thereof. While the following description will be described in terms of content presentation systems and processes for clarity and placing the invention in context, it should be kept in mind that the teachings herein may have broad application to all types of systems, devices and applications.

Statistical filtering of data using graphical user interfaces in information technology systems is provided. One embodiment comprises generating a graphical statistical representation of a data set and displaying the graphical statistical representation on an electronic display. One or more manipulable graphical elements are also displayed in conjunction with the graphical statistical representation, wherein the manipulable graphical elements represent one or more statistical ranges for the graphical statistical representation. Based on user adjusting one or more of the manipulable graphical elements specifying one or more adjusted statistical ranges, the data set is filtered to correspond to the graphical statistical representation within the one or more adjusted statistical ranges.

An embodiment of the invention provides a data manipulation method and system for manipulating data presented in various forms, in a graphical user interface of an information technology system. An embodiment of the data manipulation system allows manipulation of tabular information by providing a user with a manipulable distribution graphic module in a graphical user interface. The manipulable distribution graphic module represents the tabular information in association with a data processing module (e.g., spreadsheet application) that generates the tabular information. In one embodiment, the manipulable distribution graphic module provides a statistical distribution curve filter (e.g., bell curve) wherein the user can manipulate the statistical distribution curve to filter the tabular data. For example, a user may filter data by adjusting user-adjustable graphic bars on the graphic distribution filter.

In one embodiment, the manipulable distribution graphic module allows the user to filter a table using statistical processes that are based on user manipulation of the GUI widget. This allows the user to quickly receive visual feedback of such manipulation, without having to know statistical concepts.

FIG. 1A shows a block diagram of an information technology system 1 implementing manipulable distribution graphic module, according to an embodiment of the invention. The system 1 comprises an electronic device 3 such as a computing device. The device 3 includes a user interface (UI) control system 2 providing content presentation in a graphical user interface 6 on an electronic display screen/monitor 7. The UI control system 2 controls the user interface 6 based on user input (input event) via the input device 4.

In one embodiment, the UI control system 2 includes a manipulable distribution graphic module (MDGM) 5 which dictates system response based on user interaction with the device 3, as described herein.

Figure 1B:
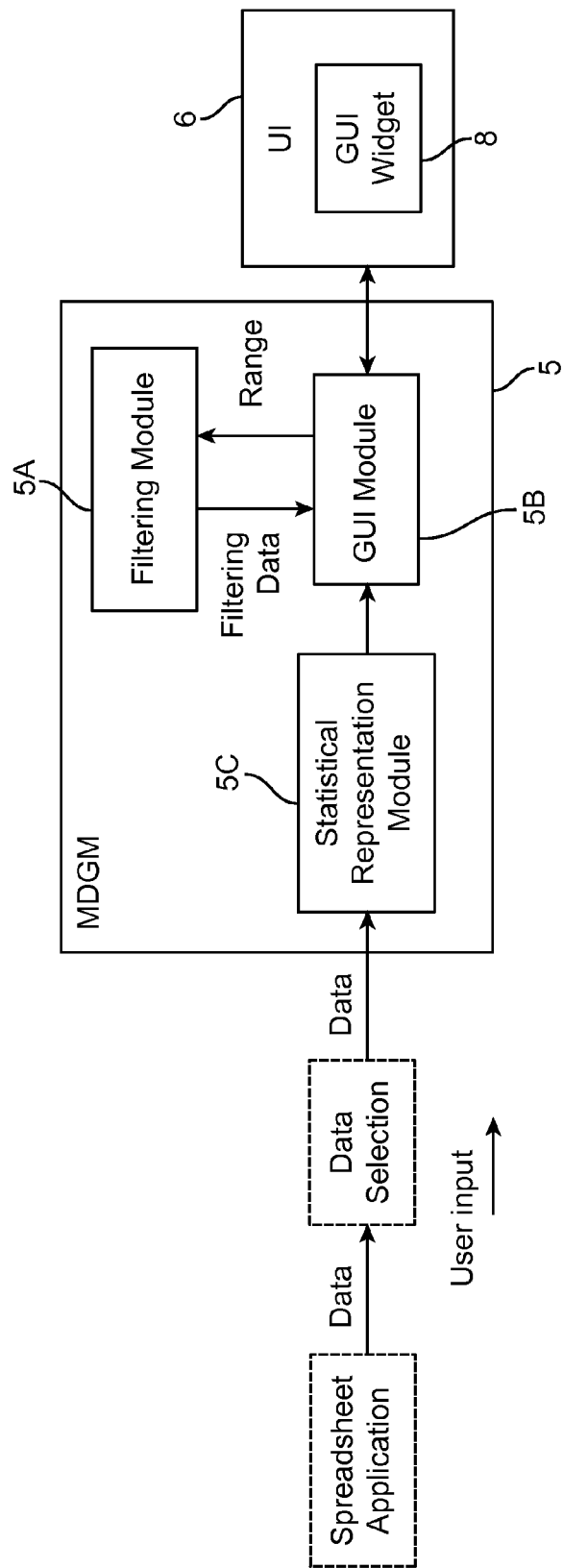
FIG. 1B illustrates a system model for statistical filtering of data using a graphical user interface according to one embodiment of the invention.

Referring to FIG. 1B, in one embodiment, the MDGM 5 includes a filtering module 5A and a GUI module 5B. The filtering module 5A includes statistical filtering processes for filtering data (such as table data from a spreadsheet application) based on statistical ranges provided by a user. The GUI module 5B displays a user manipulable GUI widget 8 on the UI 6 that allows the user to provide said statistical ranges for the filtering module 5A.

The MDGM 5 further includes a statistical representation module 5C that provides a statistical representation (e.g., bell curve) of the table data to the GUI module 5B for display in the GUI widget 8. The data input for the statistical representation module 5C may be a selection of the data from a data source (e.g., a data column or data row) based on a data selection process.

The GUI widget 8 displays said statistical representation. The statistical representation is based on a statistical process implemented by the statistical representation module 5C.

The user utilizes the GUI widget 8 to graphically adjust statistical range of the data on the statistical representation in the GUI widget 8. The adjusted statistical range is then utilized by the filtering module 5A to filter the table data. The filtered data is provided to the GUI module 5B which causes the GUI widget 8 to display the filtered data in the UI 6, based on the adjusted statistical range, along with the corresponding statistical representation.

Figure 2A:
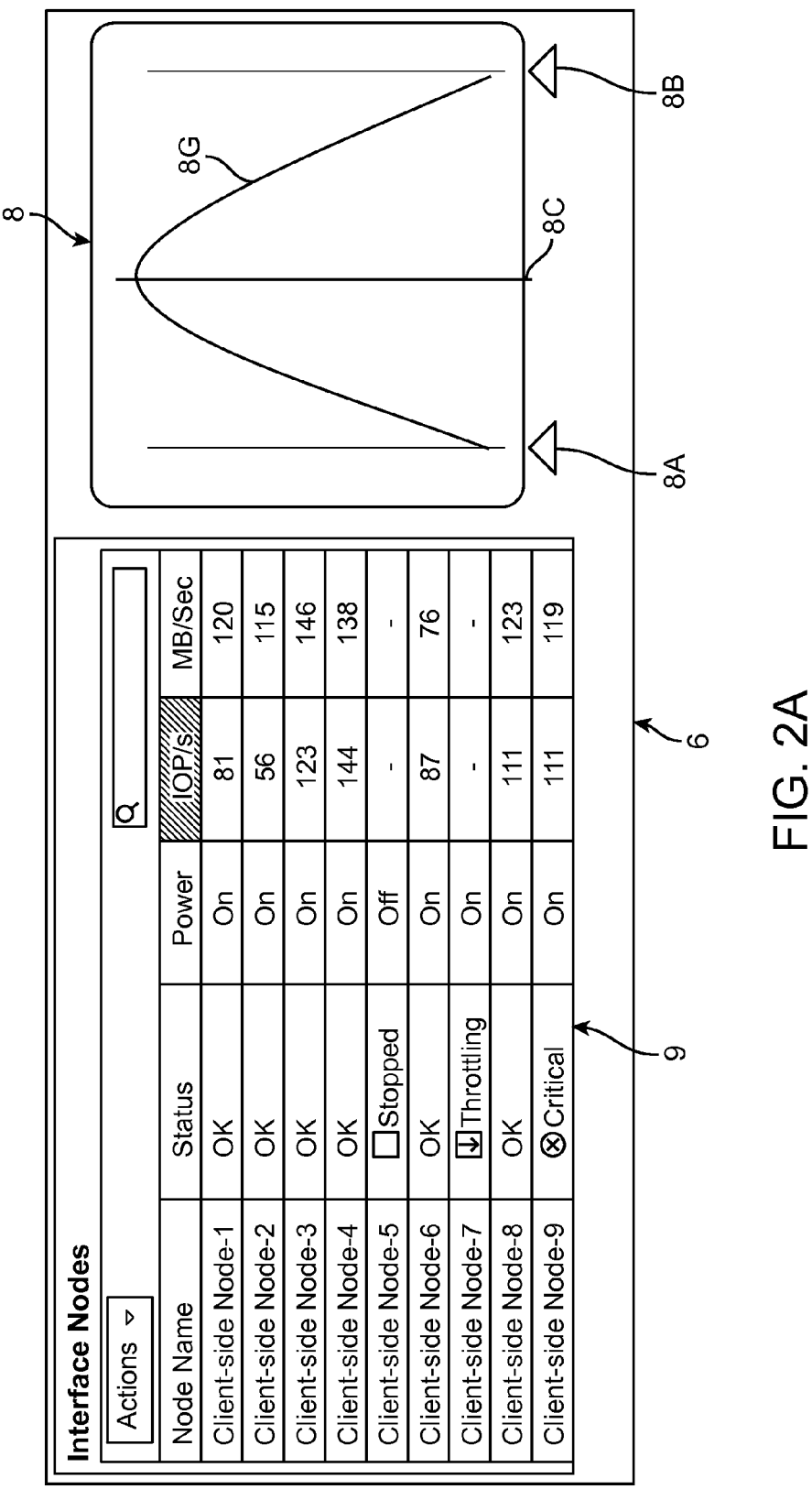
FIG. 2A illustrates example information displayed in a graphical user interface by a manipulable distribution graphic module for statistical filtering of data using a graphical user interface according to an embodiment of the invention.

FIG. 2A illustrates example information displayed in the UI 6 by the MDGM 5, wherein the example information includes example table data 9 and a corresponding GUI widget 8, according to an embodiment of the invention. In this example, the GUI widget 8 comprises a dialog window in the UI 6. In this example, table 9 includes rows and columns of data indicating performance information about interface nodes in a computing system including clients and servers (e.g., status, power, IOP/s, MB/Sec). Although table 9 shows computing system performance data, embodiments of the invention are applicable to other types of data (e.g., housing price trends in different neighborhoods, stock market feed, etc.).

The GUI widget 8 includes a graph 8G providing a statistical representation (e.g., bell curve) of the table data, as described below. The statistical representation is based on the statistical process.

In this embodiment, the GUI widget 8 includes three manipulable (i.e., adjustable) GUI elements 8A, 8B and 8C. The user can horizontally adjust (either left or right) a first GUI element 8A comprising a left range control slider. The user can also horizontally adjust (either left or right) a second GUI element 8B comprising a right range control slider, independent of the GUI element 8A. By increasing or decreasing the distance between the GUI elements 8A and 8B, the user systematically increases and decreases the statistical range, and thereby, increases/decreases the number of entries displayed in the table 9 (i.e., filters data displayed in the table 9).

FIG. 2A shows a complete data set (i.e., no filtering) in the data table 9. The table 9 comprises multiple rows and columns of data, wherein a selected table column (e.g., IOP/s) is used by the statistical representation module 5C (FIG. 1B). As such, in FIG. 2A the range provided by the GUI widget 8 to the filtering module 5A is set at 100%. At this setting, none of the table entries are filtered. The vertical bar 8C represents the mean of the data in the selected table column.

Figure 2B:
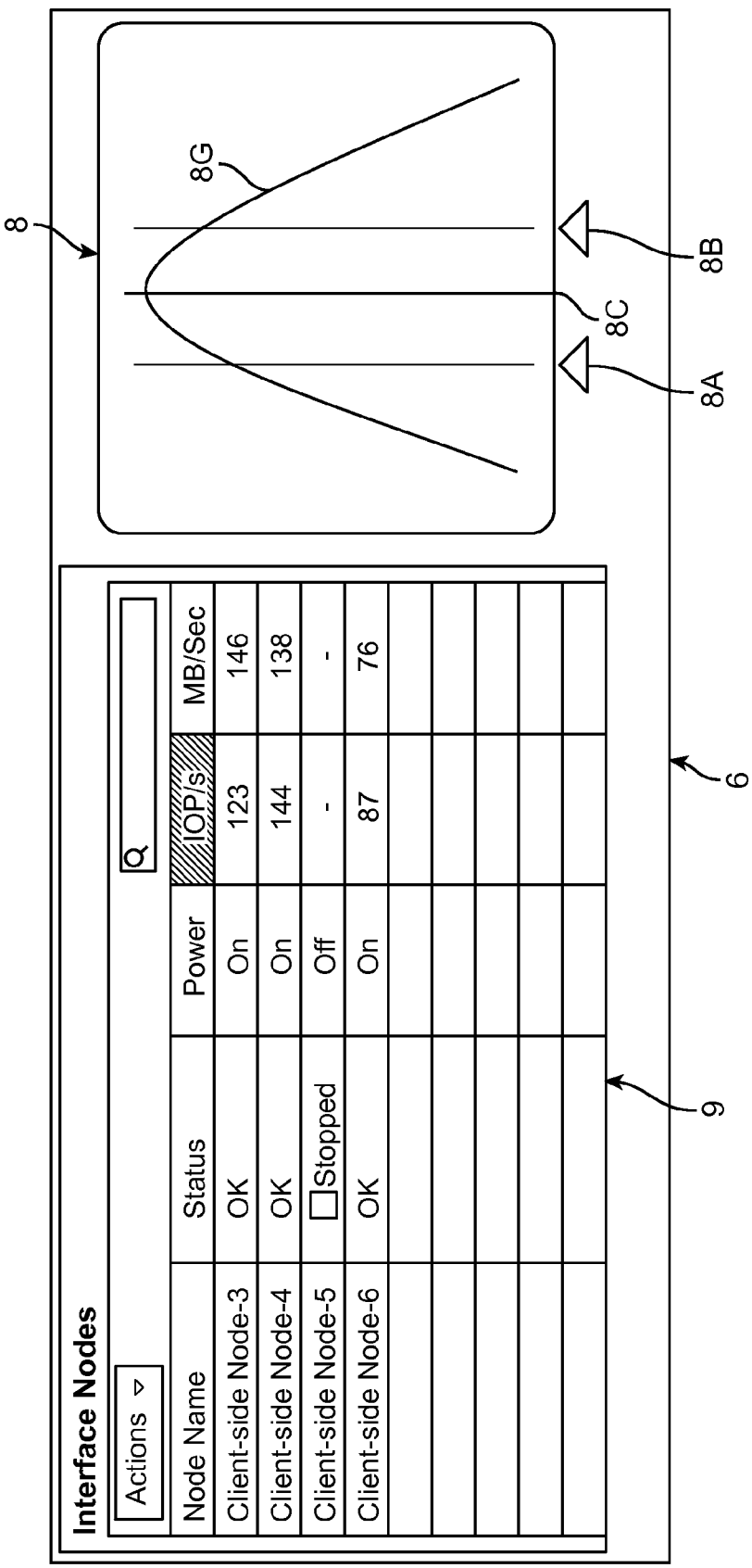
FIG. 2B illustrates manipulation of the manipulable distribution graphic module for statistical filtering of data in FIG. 2A using a graphical user interface according to an embodiment of the invention.

Referring to FIG. 2B, the user wishes to view only table entries around the mean of the data where vertical bar 8C is located, with an approximate 15% range on either side of the vertical bar 8C. To achieve this desired setting, the user interacts with the GUI widget 8 using an input pointer such as a mouse (as controlled by the GUI module 5B), and slides the two range slider 8A and 8B towards the center as shown in FIG. 2B. That range setting is provided to the filtering module 5A, wherein the filtering module 5A filters selected column data around the mean at the vertical bar 8C with approximately 15% range on either side. The GUI module 5B updates the table 9 displayed in the UI 6 to reflect the filtered data from the filtering module 5A.

The user can also adjust the third GUI element 8C comprising the single vertical bar. By sliding the vertical bar 8C horizontally (either left or right), both range slider 8A and 8B move in the same corresponding direction and distance as that of vertical bar 8C shown in FIG. 2C. By doing so, the user keeps the same range in the table 9, but locates at a different percentile in the table 9.

In one embodiment, a statistical filter is used for filtering the data set such as a data table, by filtering data (rows/columns) based on a range selected by the user utilizing the GUI widget. By way of example, in FIGS. 2A and 2B, adjustment of the statistical ranges using the GUI elements (e.g., 8A, 8B), does not affect the shape of graph 8G and only the data set is filtered and displayed when the user adjusts the adjustable GUI elements. As such, embodiments of the invention provide a method and system for allowing a user to filter data (rows/columns) contained in a data table using a statistical algorithm. Embodiments of the invention further allow filtering data contained in a data table by adjusting a range displayed in a widget, the range being calculated in relation to the mean of numerical data values contained in the data table.

Figure 2C:
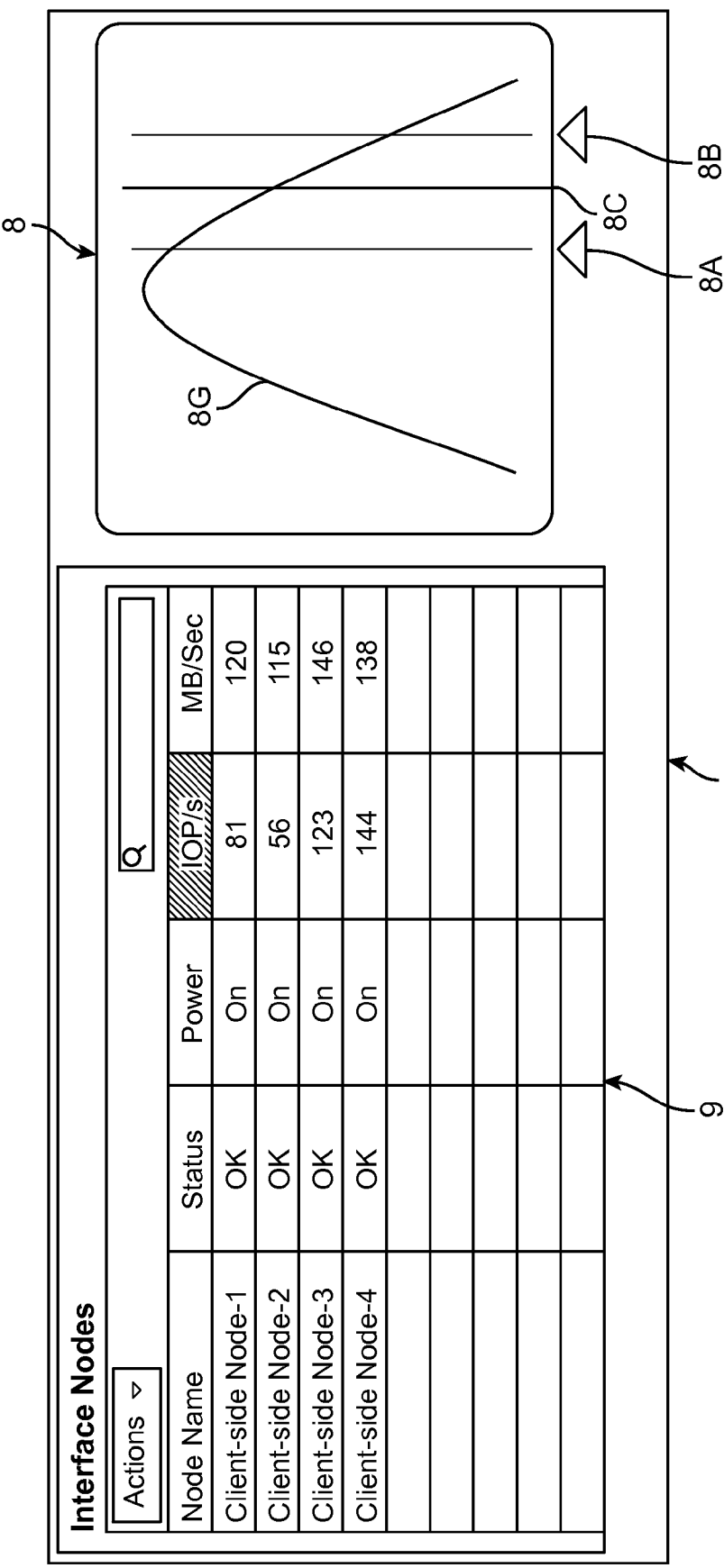
FIG. 2C illustrates further manipulation of the manipulable distribution graphic module for statistical filtering of data in FIG. 2B using a graphical user interface according to an embodiment of the invention.

Referring to FIG. 2C, in another example, the user wishes to view only table entries around the upper quartile mean of the data. To achieve this desired setting, the user interacts with the GUI widget 8 (as controlled by the GUI module 5B), and moves the vertical bar 8C to the right. That range setting is provided to the filtering module 5A, wherein the filtering module 5A filters selected column data around the 75 percentile. The GUI module 5B updates the table 9 displayed in the UI 6 to reflect the filtered data from the filtering module 5A.

Figure 3:
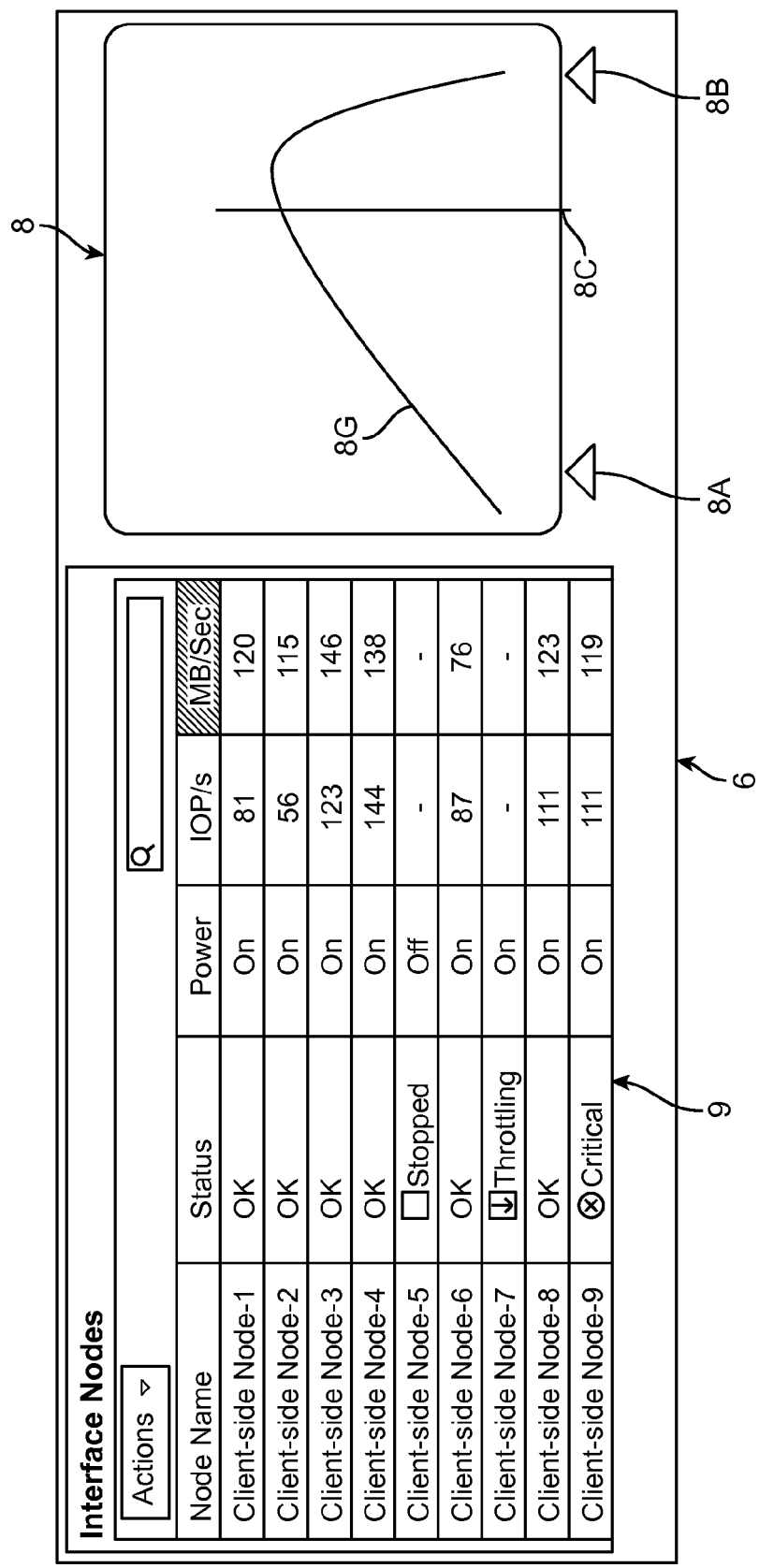
FIG. 3 illustrates data set selection for statistical filtering using a graphical user interface according to an embodiment of the invention.

The shape of graph 8G is not limited to a bell curve. The shape of graph 8G reflects the distribution of a data population making up the selected column based on a statistical process (e.g., bell curve) utilized by the statistical representation module 5C. As such, the shape of graph 8G may be positively or negatively skewed, depending on the values contained in a selected row. For example, FIG. 2C shows a normally distributed graph 8G when the selected column is "IOP/s". However, the graph 8G is skewed when another column (i.e., "MB/Sec") of table 9 is selected as illustrated by a positively skewed graph 8G in FIG. 3.

Figure 4:
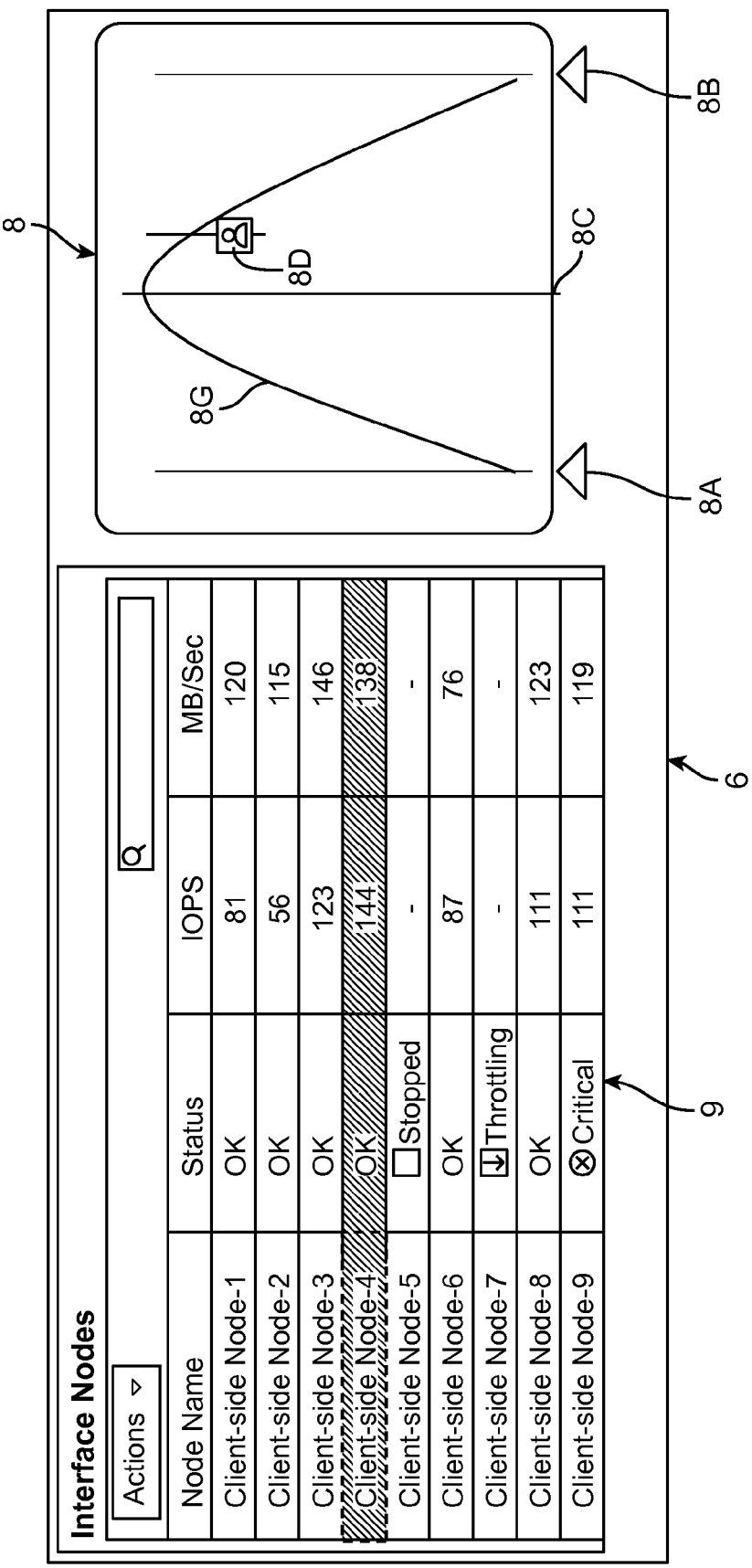
FIG. 4 illustrates data set selection for statistical filtering using a graphical user interface according to an embodiment of the invention.

In one embodiment of the invention, as illustrated by example in FIG. 4, upon selecting a row (e.g., "Client-side Node-4") in the table 9 shown in FIG. 2A, the GU widget 8 designates data corresponding to the selected row using a GUI element 8D on the graph 8G, in relation to the norm at the vertical line 8C.

Figure 5:
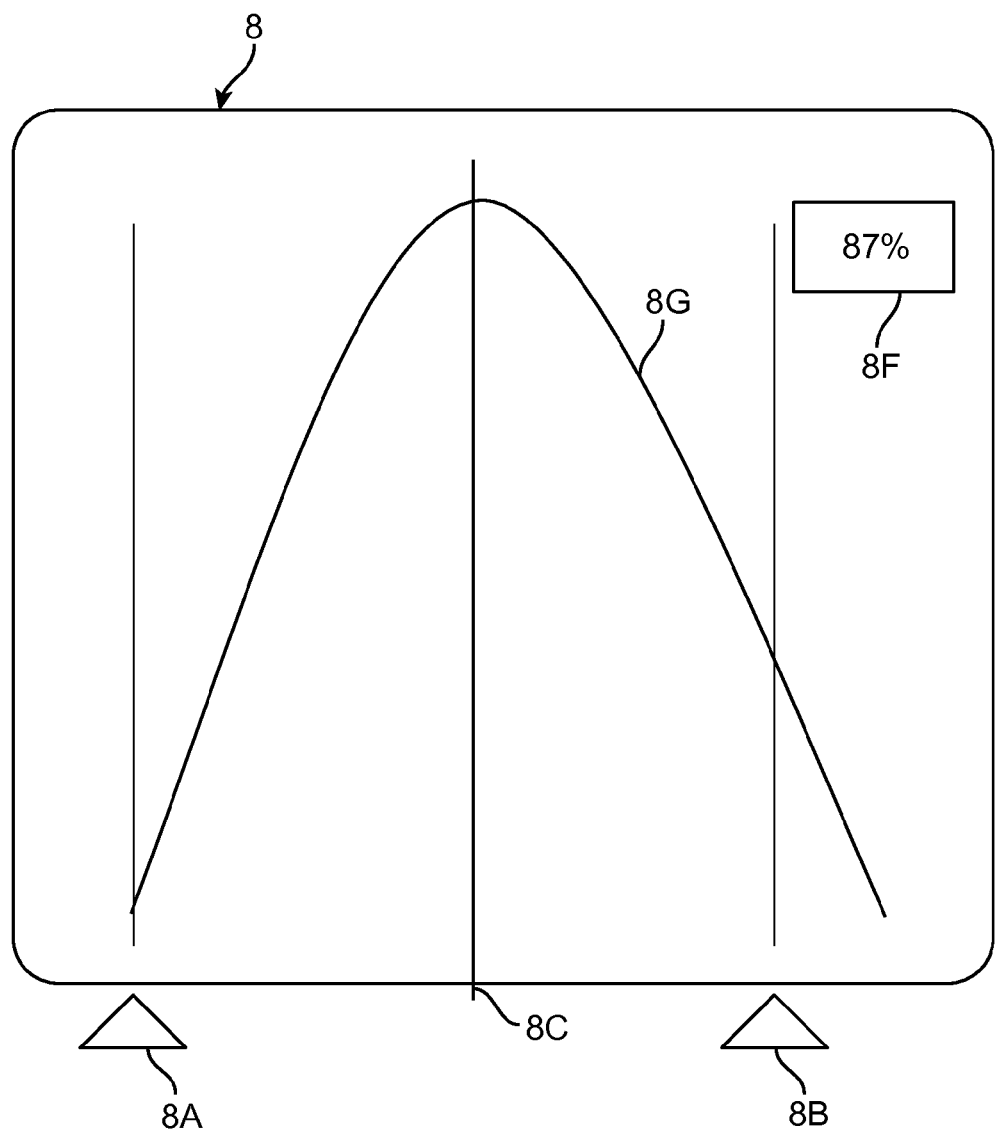
FIG. 5 illustrates range selection precision for statistical filtering using a graphical user interface according to an embodiment of the invention.

In one embodiment of the invention, as illustrated by example in FIG. 5, when the user desires more precision in positioning a range slider or vertical bar, a fly over window 8F displays a numerical reading representation of a user manipulable GUI element of the widget 8, such as when the user slides a range slider (8A, 8B) or vertical bar (8C).

In one example application, an embodiment of the manipulable distribution graphic module allows a prospective home owner searching a list of homes on a computer (with home prices being a determent factor), display a currently selected price range against a visual norm displayed by the GUI widget. Using the GUI widget, the user can quickly filter down the available houses to the desired range (e.g., average price homes±10%).

Alternative to the user setting the desired range, in one embodiment the GUI widget 8 may provide a property display, from which the user can select from several pre-defined statistical settings (e.g., 1 standard deviation above the norm).

Figure 6:
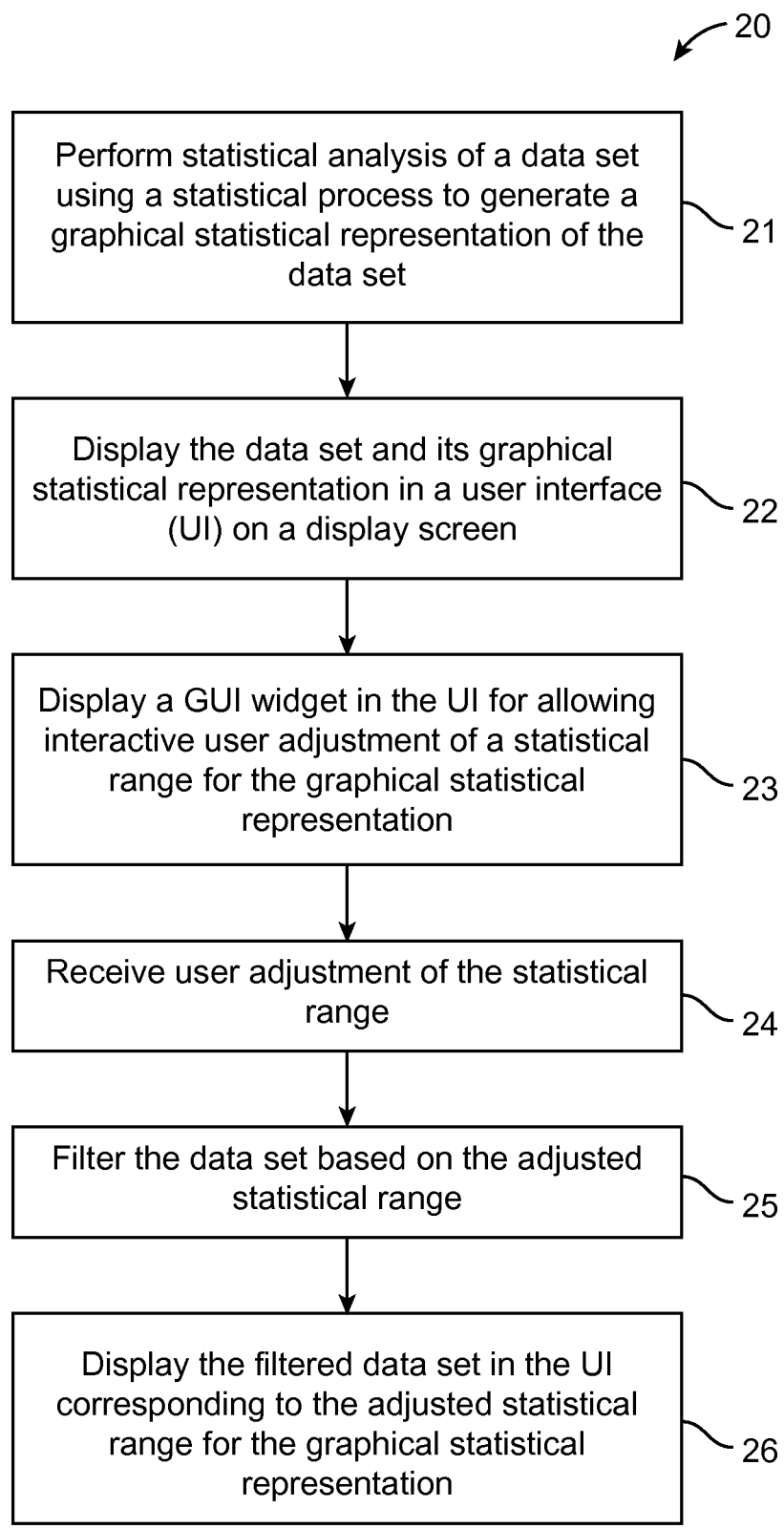
FIG. 6 shows a flowchart of a process for a computer-implemented method for statistical filtering of data presented in various forms, in a graphical user interface of an information technology system, according to an embodiment of the invention.

FIG. 6 shows a flowchart of a process 20 for a computer-implemented method for manipulating data presented in various forms, in a graphical user interface of an information technology system. The process 20 comprises the following process blocks:

Block 21: Perform statistical analysis of a data set using a statistical process to generate a graphical statistical representation of the data set.

Block 22: Display the data set and its graphical statistical representation in a user interface (UI) on a display screen.

Block 23: Display a GUI widget in the UI for allowing interactive user adjustment (manipulation) of a statistical range for the graphical statistical representation.

Block 24: Receive user adjustment of the statistical range.

Block 25: Filter the data set based on the adjusted statistical range, wherein the filtered data set corresponds to the graphical statistical representation within the adjusted statistical range. For example, if user adjusted range to 65% for a lower limit (using slider 8A) and 85% for a higher limit (using slider 8B), the system calculates what the raw data score would be (e.g., 96 to 122 MB/Sec in table 9), then the system performs a row by row determination using a if-then statement for filtering (e.g., if MB/Sec is >96 and <122 then display table entry, else hide table entry in table 9).

Block 26: Display the filtered data set in the UI corresponding to the adjusted statistical range for the graphical statistical representation.

Figure 7A:
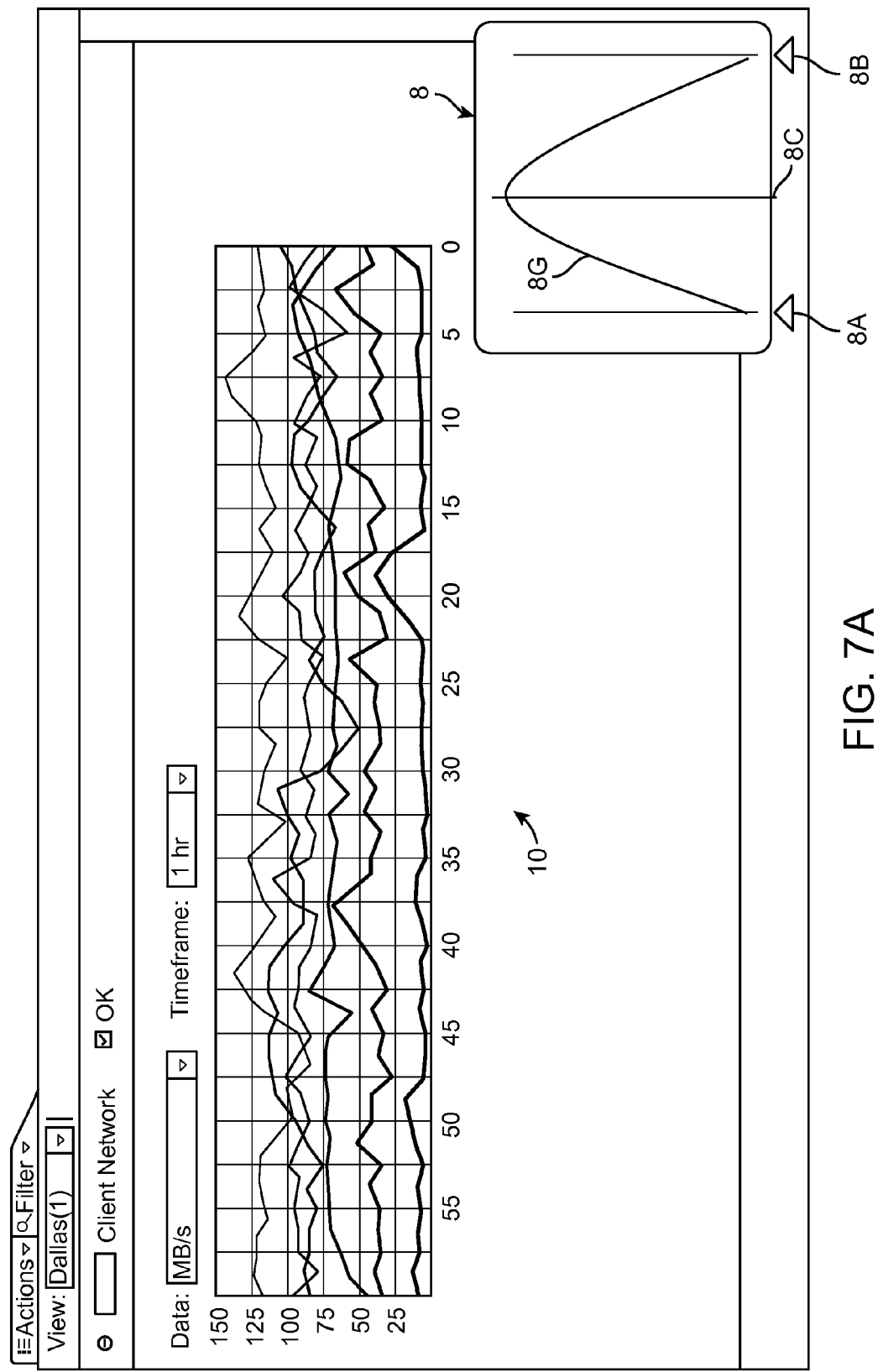
FIG. 7A illustrates a data graph set for statistical filtering in a graphical user interface according to an embodiment of the invention.

Embodiments of the invention are useful with not only tabular data, but also other forms of data. FIG. 7A shows a data graph set 10 as input data for the MDGM 5, according to an embodiment of the invention. The data graph set 10 may comprise real-time time data or data that is periodically updated from a data source (e.g., a network throughput monitor). FIG. 7A shows a complete data set (i.e., no filtering) of the data graph set 10, and corresponding GUI widget 8 (similar to FIG. 2A), according to an embodiment of the invention.

Figure 7B:
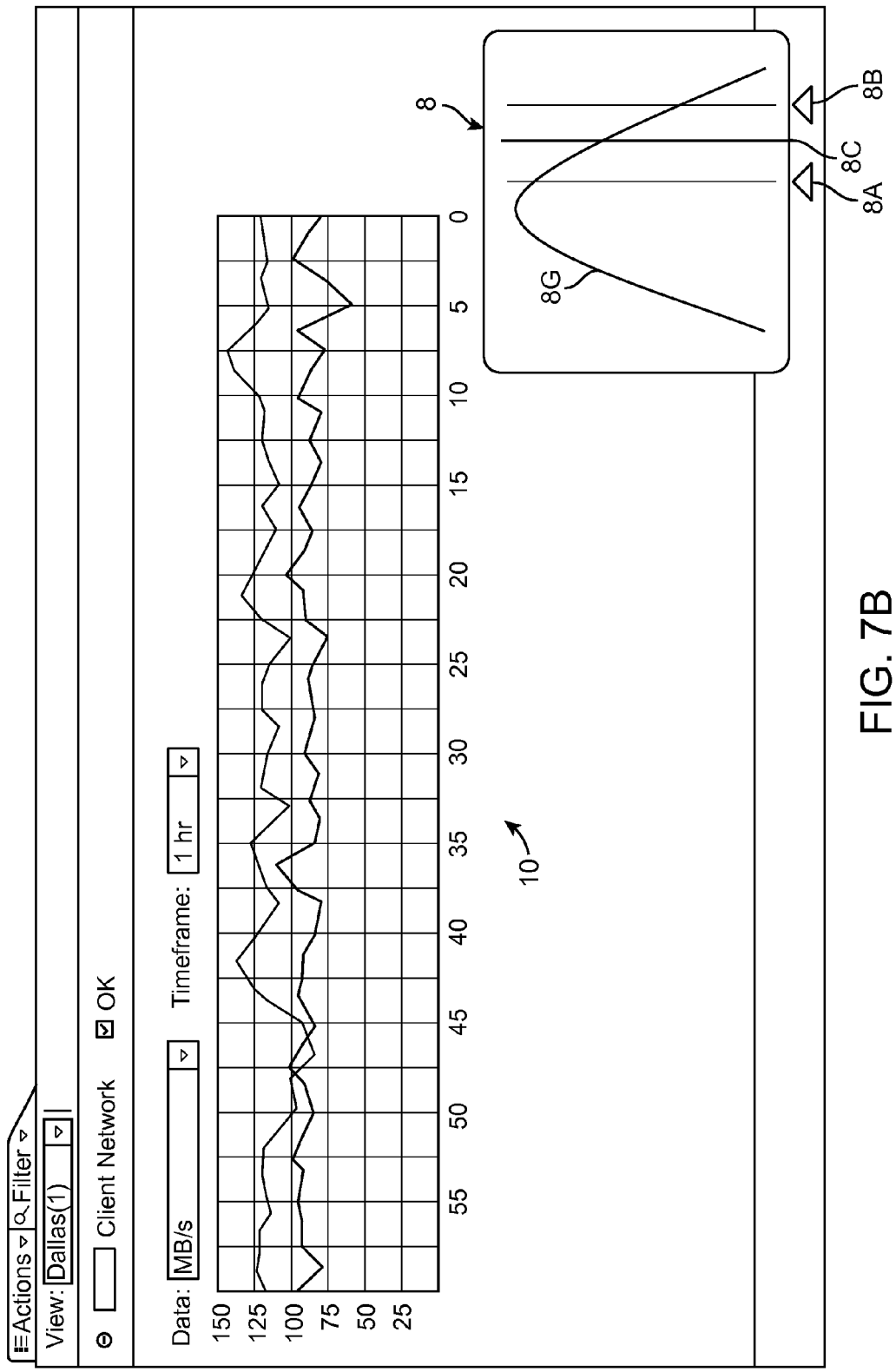
FIG. 7B illustrates manipulation of the manipulable distribution graphic module for statistical filtering of data graph set of FIG. 7A for statistical filtering in a graphical user interface according to an embodiment of the invention.

FIG. 7B shows user manipulation of the GUI elements of the GUI widget 8 (similar to FIG. 2C), wherein the user wishes to view only graphs in the data graphs set 10 around the upper quartile mean of the data. To achieve this desired setting, the user interacts with the GUI widget 8 (as controlled by the GUI module 5B), and moves the vertical bar 8C to the right. That setting is provided to the filtering module 5A, wherein the filtering module 5A filters data graph set 10 around the 75 percentile. The GUI module 5B updates the data graph set 10 displayed in the UI 6 to reflect the filtered data from the filtering module 5A. In one example, the statistical GUI widget 8 displays the currently selected range against a visual norm, whereby the user can quickly filter down data to a desired range (e.g., average value±10%).

Embodiments of the present invention provide a system implementing a method for allowing a user to filter a data set. The system provides a graphical statistical representation of the data set, and allows a user to specify filtering of the data set by interactively adjusting graphical elements displayed in conjunction with the graphical statistical representation by a GUI widget. The adjustment of the graphical elements is utilized as adjustment of one or more statistical ranges for the graphical statistical representation. The adjusted range is then used to filter the data set to correspond to the graphical statistical representation within the adjusted statistical range. Embodiments of the invention provide a filtering mechanism allowing a user to quickly and efficiently reduce the number of entries/rows in a table for ease of viewing and comprehension.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
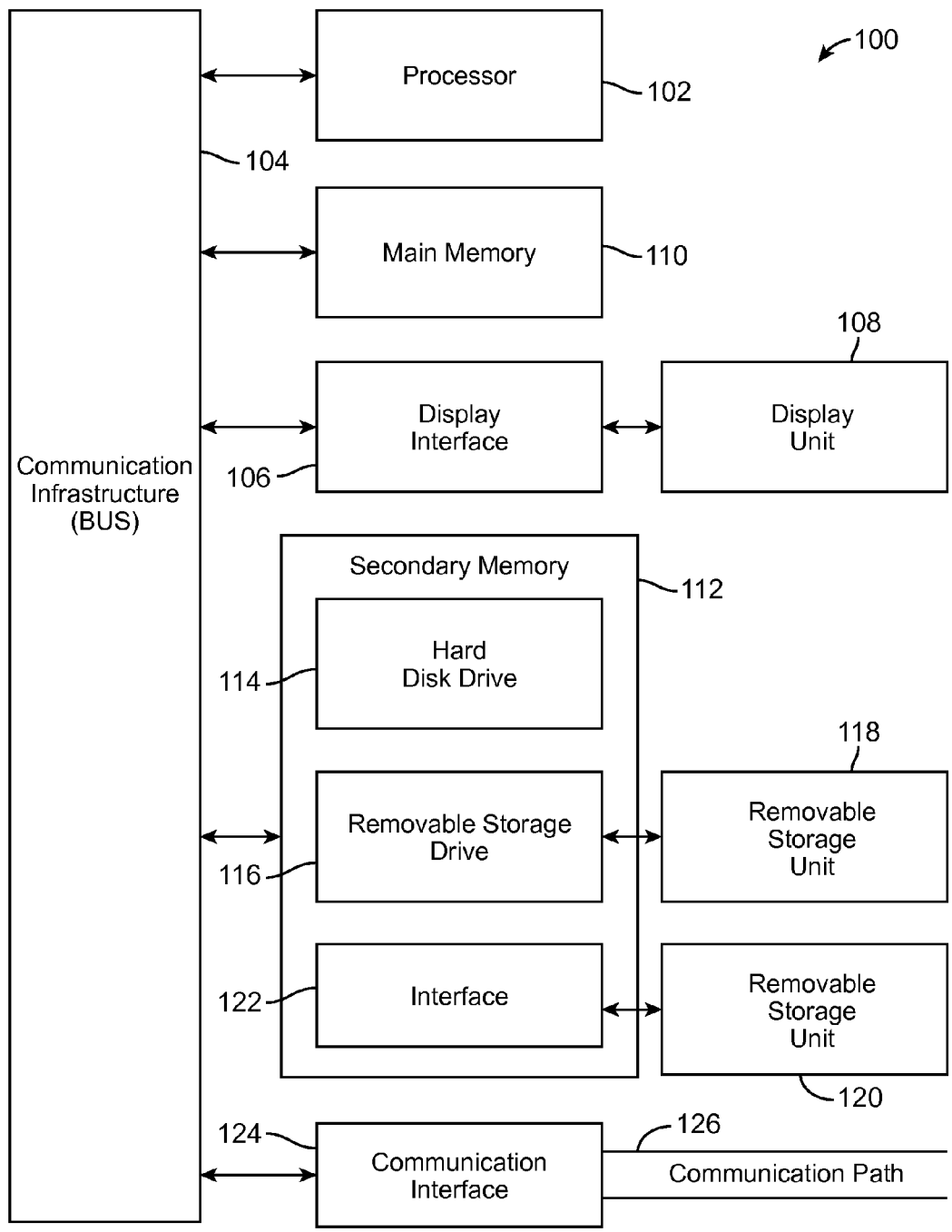
FIG. 8 illustrates a high level block diagram of an information processing system useful for implementing one embodiment of the invention.

FIG. 8 is a high level block diagram showing an information processing system 100 useful for implementing one embodiment of the present invention. The computer system 100 includes one or more processors, such as one or more processors 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of data filtering in an information technology system, comprising:
   generating a graphical statistical representation of a data set in a first graphical user interface;
   displaying the graphical statistical representation on an electronic display;
   displaying multiple manipulable graphical elements in a second graphical user interface in conjunction with the graphical statistical representation, wherein a pair of particular manipulable graphical elements represents statistical ranges for the graphical statistical representation on either side of another particular manipulable graphical element;
   receiving user input adjusting one or more of the manipulable graphical elements specifying one or more adjusted statistical ranges;
   filtering the data set to correspond to the graphical statistical representation within the one or more adjusted statistical ranges;
   wherein, the graphical statistical representation of the data set comprises a bell curve, each of the pair of particular manipulable graphical elements adjust a separate statistical range on different sides of the other particular manipulable graphical element, and the other particular manipulable graphical element adjusts a statistical percentile.

2. The method of claim 1, further comprising:
   displaying the data set along with the graphical statistical representation on the electronic display, wherein the second graphical user interface is displayed within the first graphical user interface.

3. The method of claim 2, further comprising:
   displaying the filtered data set along with the graphical statistical representation and graphical elements.

4. The method of claim 1, wherein:
   generating a graphical statistical representation of a data set further comprises utilizing a statistical process comprises statistical analysis of the data set.

5. The method of claim 1, further comprising:
   receiving data from a data source; and
   receiving user input selecting a subset of the data as the data set for generating a graphical statistical representation thereof.

6. The method of claim 1, wherein:
   the data set comprises tabular information in rows and columns; and
   filtering the data set further comprises eliminating information from one or more rows and/or columns of the tabular information such that the filtered data set corresponds to the graphical statistical representation within the one or more adjusted statistical ranges.

7. A system for filtering information, comprising:
   a processor;
   a representation module that uses the processor to generate a graphical statistical representation of a data set;
   a user interface module that uses the processor to display the graphical statistical representation in a first graphical user interface on an electronic display, and displays multiple manipulable graphical elements in conjunction with the graphical statistical representation in a second graphical user interface, wherein a pair of particular manipulable graphical elements represents statistical ranges for the graphical statistical representation on either side of another particular manipulable graphical element, the user interface module receiving user input adjusting one or more of the manipulable graphical elements specifying one or more adjusted statistical ranges;
   a filtering module that uses the processor to filter the data set to correspond to the graphical statistical representation within the one or more adjusted statistical ranges,
   wherein, the user interface module uses the processor to display the filtered data set along with the graphical statistical representation and graphical elements, each of the pair of particular manipulable graphical elements adjust a separate statistical range on different sides of the other particular manipulable graphical element, and the other particular manipulable graphical element adjusts a statistical percentile.

8. The system of claim 7, wherein:
   the user interface module displays the data set along with the graphical statistical representation on the electronic display, and the second graphical user interface is displayed within the first graphical user interface.

9. The system of claim 7, wherein:
   the representation module generates a graphical statistical representation of a data set utilizing a statistical process comprises statistical analysis of the data set.

10. The system of claim 7, wherein:
    the user interface module receives user input selecting a subset of data from a data source, such that the representation module generates a graphical statistical representation for the selected subset.

11. The system of claim 7, wherein:
    the data set comprises tabular information in rows and columns; and
    the filtering module filters the data set by eliminating information from one or more rows and/or columns of the tabular information such that the filtered data set corresponds to the graphical statistical representation within the one or more adjusted statistical ranges.

12. A computer program product comprising:
a non-transitory computer usable storage medium having computer readable program code embodied therewith for execution on a computer, the computer readable program code configured to:
generate a graphical statistical representation of a data set;
display the graphical statistical representation in a first user interface on an electronic display, and display multiple manipulable graphical elements in conjunction with the graphical statistical representation in a second graphical user interface, wherein a particular pair of the manipulable graphical elements represents statistical ranges for the graphical statistical representation on either side of another particular manipulable graphical element,
further receive user input adjusting one or more of the manipulable graphical elements specifying one or more adjusted statistical ranges;
filters the data set to correspond to the graphical statistical representation within the one or more adjusted statistical ranges;
wherein the graphical statistical representation of the data set comprises a bell curve each of the pair of particular manipulable graphical elements adjust a separate statistical range on different sides of the other particular manipulable graphical element, and the other particular manipulable graphical element adjusts a statistical percentile.

13. The computer program product of claim 12, wherein the computer readable program code is configured to:
display the data set along with the graphical statistical representation on the electronic display, wherein the second graphical user interface comprises a widget that is displayed within the first graphical user interface.

14. The computer program product of claim 13, wherein the computer readable program code is configured to:
display the filtered data set along with the graphical statistical representation and graphical elements.

15. The computer program product of claim 12, wherein the computer readable program code is configured to:
generate a graphical statistical representation of a data set utilizing a statistical process comprises statistical analysis of the data set.

16. The computer program product of claim 12, wherein the computer readable program code is configured to:
receive user input selecting a subset of data from a data source, and generate a graphical statistical representation for the selected subset.

17. The computer program product of claim 12, wherein:
the data set comprises tabular information in rows and columns; and
the computer readable program code is configured to filter the data set by eliminating information from one or more rows and/or columns of the tabular information such that the filtered data set corresponds to the graphical statistical representation within the one or more adjusted statistical ranges.

* * * * *